US010616134B1

United States Patent
Greenwood et al.

(10) Patent No.: US 10,616,134 B1
(45) Date of Patent: Apr. 7, 2020

(54) PRIORITIZING RESOURCE HOSTS FOR RESOURCE PLACEMENT

(71) Applicant: Amazon Technologies, Inc., Seattle, WA (US)

(72) Inventors: Christopher Magee Greenwood, Seattle, WA (US); Surya Prakash Dhoolam, Seattle, WA (US); Nishant Satya Lakshmikanth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 14/661,627

(22) Filed: Mar. 18, 2015

(51) Int. Cl.
*H04L 12/911* (2013.01)

(52) U.S. Cl.
CPC .......... *H04L 47/821* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 7,333,459 B2 * | 2/2008 | Feyerabend | H04L 29/06 370/338 |
| 7,502,859 B2 | 3/2009 | Inoue et al. | |
| 7,509,671 B1 | 3/2009 | Bedell et al. | |
| 8,424,059 B2 | 4/2013 | Kwok et al. | |
| 8,452,819 B1 | 5/2013 | Sorenson, III et al. | |
| 9,122,530 B2 * | 9/2015 | Hatasaki | G06F 9/5011 |
| 9,363,192 B2 * | 6/2016 | Padala | G06F 9/5027 |
| 9,417,903 B2 * | 8/2016 | Bello | G06F 9/45558 |
| 2003/0058855 A1 * | 3/2003 | Feyerabend | H04L 29/06 370/389 |
| 2006/0224805 A1 | 10/2006 | Pruscino et al. | |
| 2008/0091806 A1 * | 4/2008 | Shen | G06F 9/5061 709/223 |
| 2010/0306382 A1 | 12/2010 | Cardosa et al. | |
| 2011/0010634 A1 * | 1/2011 | Hatasaki | G06F 9/5011 715/739 |

(Continued)

FOREIGN PATENT DOCUMENTS

| | | |
|---|---|---|
| JP | 2009140356 | 6/2009 |
| JP | 2013152553 | 8/2013 |

(Continued)

OTHER PUBLICATIONS

U.S. Appl. No. 13/053,469, filed Mar. 22, 2011, James Christopher Sorenson, et al.
U.S. Appl. No. 13/903,670, filed May 28, 2013, James Christopher Sorenson, et al.
U.S. Appl. No. 14/642,445, filed Mar. 9, 2015, Marc John Brooker.
U.S. Appl. No. 14/643,479, filed Mar. 10, 2015, Christopher Magee Greenwood.

(Continued)

*Primary Examiner* — Scott B Christensen
(74) *Attorney, Agent, or Firm* — Robert C. Kowert; Kowert, Hood, Munyon, Rankin & Goetzel, P.C.

(57) ABSTRACT

A distributed system may implement prioritizing resource hosts for resource placement. A placement request for a resource to be placed in a distributed system at a resource host may be received. Available resource hosts may be filtered out according to placement constraints. The resource hosts may be assigned to different priority sets according to a priority scheme for placing resources at resource hosts. Evaluations of resource hosts from the different priority sets may be performed to select candidate resource hosts to provide as possible placement locations.

19 Claims, 9 Drawing Sheets

(56) References Cited

U.S. PATENT DOCUMENTS

| | | | |
|---|---|---|---|
| 2013/0151683 A1 | 6/2013 | Jain et al. | |
| 2013/0268672 A1 | 10/2013 | Justafort et al. | |
| 2014/0380303 A1* | 12/2014 | Bello | G06F 9/45558 718/1 |
| 2015/0120931 A1* | 4/2015 | Padala | G06F 9/5027 709/226 |

FOREIGN PATENT DOCUMENTS

| | | |
|---|---|---|
| KR | 10-2011-0034666 | 4/2011 |
| WO | 2010016104 | 11/2010 |
| WO | 2014073024 | 5/2014 |

OTHER PUBLICATIONS

Yuval Rochman, et al., "Resource Placement and Assignment in Distributed Network Topologies," Conference: INFOCOM, 2013 Proceedings IEEE, pp. 1-9.

Yuval Rochman, et al., "Efficient Resource Placement in Cloud Computing and Network Applications," ACM vol. 42, Issue 2, Sep. 2014, pp. 1-3.

Examination Report from Application No. 2016229135, (Amazon Technologies Inc.), dated Nov. 23, 2018, pp. 1-4.

Office Action from Korean Application No. 10-2017-7024942, dated Jun. 14, 2018 (English Translation and Korean version), pp. 1-14.

* cited by examiner

PRIORITIZING RESOURCE HOSTS FOR RESOURCE PLACEMENT

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

Figure 1:
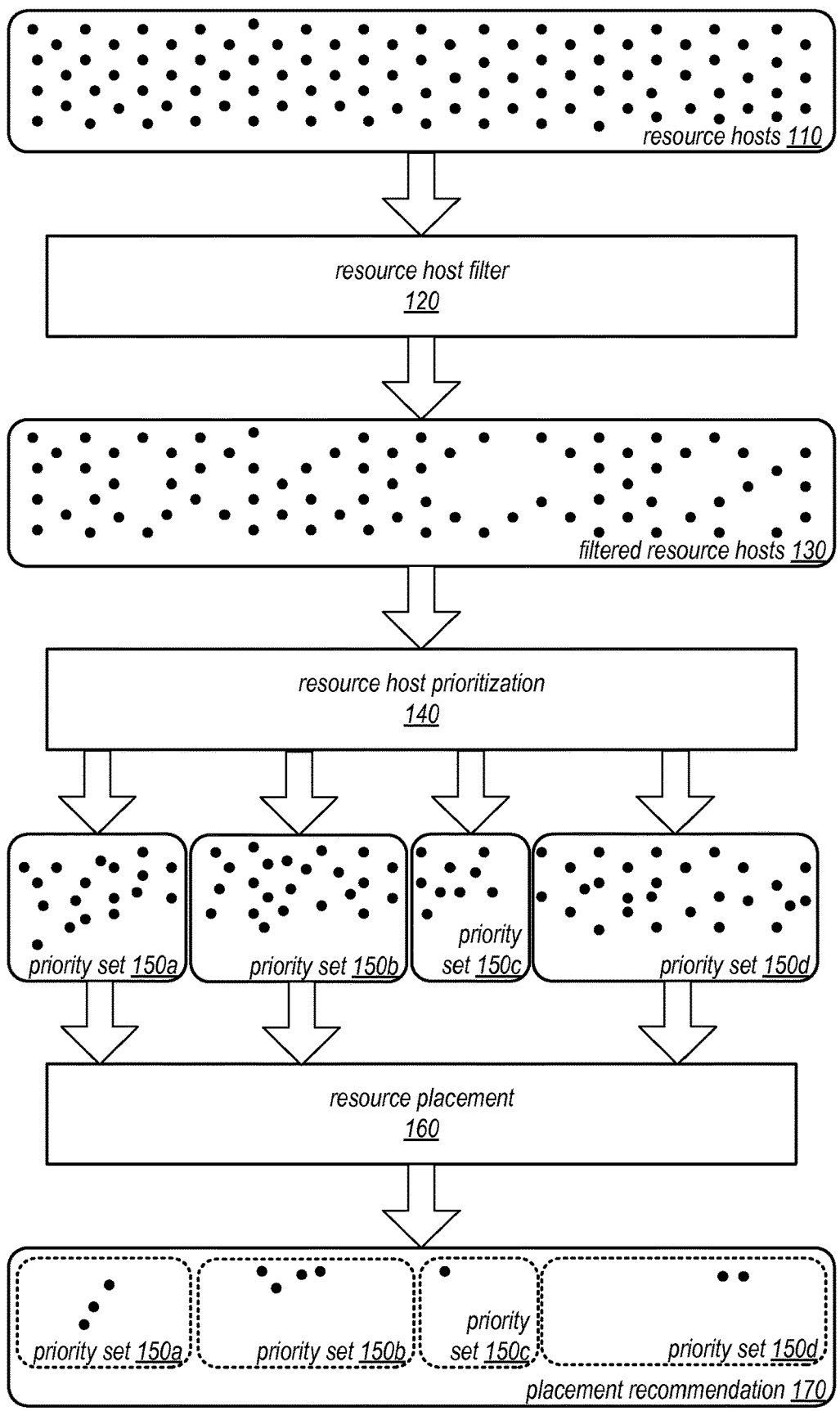
FIG. 1 illustrates a logical block diagram for resource host prioritization for resource placement, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement resource host prioritization for resource placement. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource host with which the placed resource communicates). Placement criteria may include, but are not limited to, a configuration of the resource along with other resources if part of a distributed resource (e.g., placing a master replica with respect to one or more slave replicas), available bytes, IOPs, or slots, a resource utilization balance, such as bytes to IOPs balance, impact on capacity fragmentation, hardware/software characteristics, and/or various desired location-based configurations.

For large distributed systems with numerous resource hosts, it may be impractical to evaluate all resource hosts for prospectively placing a resource according to placement criteria. The performance costs of such a large analysis for each placement decision may impede the performance of other operations or tasks. While subsets of the resource hosts in a distributed system may be chosen for placement evaluation, it may be that few of the chosen resource hosts are optimal for placing resources. Prioritizing resource hosts for resource placement provides a guarantee that at least some optimal resource hosts for placing a resource may be considered when making a placement decision.

FIG. 1 illustrates a logical block diagram for resource host prioritization for resource placement, according to some embodiments. Resource hosts 110 may be one or more computing devices, such as servers or other computing systems (e.g., computing system 1000 in FIG. 8 below) which may be utilized to host, store, or otherwise implement a resource. Resource hosts 110 may be differently configured, differently utilized, and/or differently located with respect to one another.

For placing a resource at one of the resource hosts, some resource hosts may be more optimal than others. Thus, resource host prioritization may be implemented for resource placement to ensure that some resource placement locations determined for a resource placement request may be optimal. As illustrated in FIG. 1, the resource hosts 110 of a distributed system may be filtered according to resource host filter 120. Various filter constraints may be implemented to remove resource hosts upon which the resource may not be placed. For example, placement constraints, such as requirements for specific hardware (e.g., solid state storage drives) or software (e.g., particular operating systems or application software), location requirements (e.g., locating a resource in particular location (or not in a particular location) in order to implement some placement diversity requirement with respect to other resources), performance requirements (e.g., a certain size or amount of storage or a certain amount of available IOPS) or explicitly identified resource hosts unavailable for hosting a resource (e.g., a blacklist of off limit resource hosts) may be applied to remove some resource hosts from evaluation, leaving available resource hosts for placement consideration.

Filtered resource hosts 130 may then be assigned into priority sets 150 according to resource host prioritization 140. A priority scheme may be implemented which groups or assigns the resource hosts into the different priority sets so as to identify those resource hosts with similar desirability or optimality for placing a resource. For example, network localities (e.g., resource host locations with respect to a particular network device, such as a router) may be used to assign priority values by which the resource hosts are separated into the different priority sets. In some embodiments, physical locality (e.g., room, site, server rack, etc.) may be used to assign resource hosts into priority sets. In at least some embodiments, a combination of different localities or other criteria may be implemented as part of the priority scheme, such as discussed below with regard to FIGS. 5A, 6 and 7.

Once assigned into priority sets, selections, evaluations, and determinations of the different priority sets may be performed to ensure that differently optimal resource hosts may be determined as possible placement locations for a resource. For instance, if priority set 150 includes the most optimal resource hosts, then a selection of resource hosts within the priority set 150 may be evaluated according to placement criteria. Based on the evaluation (e.g., a placement score), a number of candidate resource hosts may be determined from priority set 150 as placement locations to be provided. If, for instance, two resource hosts are to be chosen from priority set 150a, then at least two candidate resource hosts provided in a placement recommendation 170 may be highly optimal. Selection, evaluation, and determination of candidate resource hosts from other priority sets, such as sets 150b, 150c, and 150d may be determined, either alone or in various combinations, in some embodiments, such as discussed below with regard to FIGS. 5B and 7, in order to provide placement recommendations with a diverse set of potential resource hosts with different priorities.

For instance, it may be that resource hosts in a priority set are susceptible to common or correlated failures (e.g., due to location within common localities, network communication devices or physical factors, such as common power sources). Spreading out recommendations from among other priority sets may ensure that a failure affecting recommendations of resource hosts from one priority set may not affect resource hosts from other priority sets. In this way, some optimization of placement may still be provided even if, for instance, a highly optimal priority set, such as priority set 150a, may be experiencing failure, candidates resource hosts from a still optimal second priority set, such as priority set 150b may be included. As illustrated in placement recommendation 170, recommended resource hosts may be taken from different priority sets 150 and provided so that placements may be attempted at the candidate resource hosts. In at least some embodiments, the placement recommendations may provide resource hosts in a priority ordering so that a highly optimal placement can be identified and attempted first for placing a resource.

Please note that previous descriptions are not intended to be limiting, but are merely provided as an example of prioritizing resource hosts for resource placement. Various components may perform resource placement. Different numbers or types of resources may be employed.

This specification begins with a general description of a provider network, which may implement prioritizing resource hosts for resource placement offered via one or more network-based services in the provider network, such as placement for data volumes offered via a block-based storage service. Then various examples of a block-based storage service are discussed, including different components/modules, or arrangements of components/module that may be employed as part of volume placement for data volumes in the block-based storage service. A number of different methods and techniques to implement prioritizing resource hosts for resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
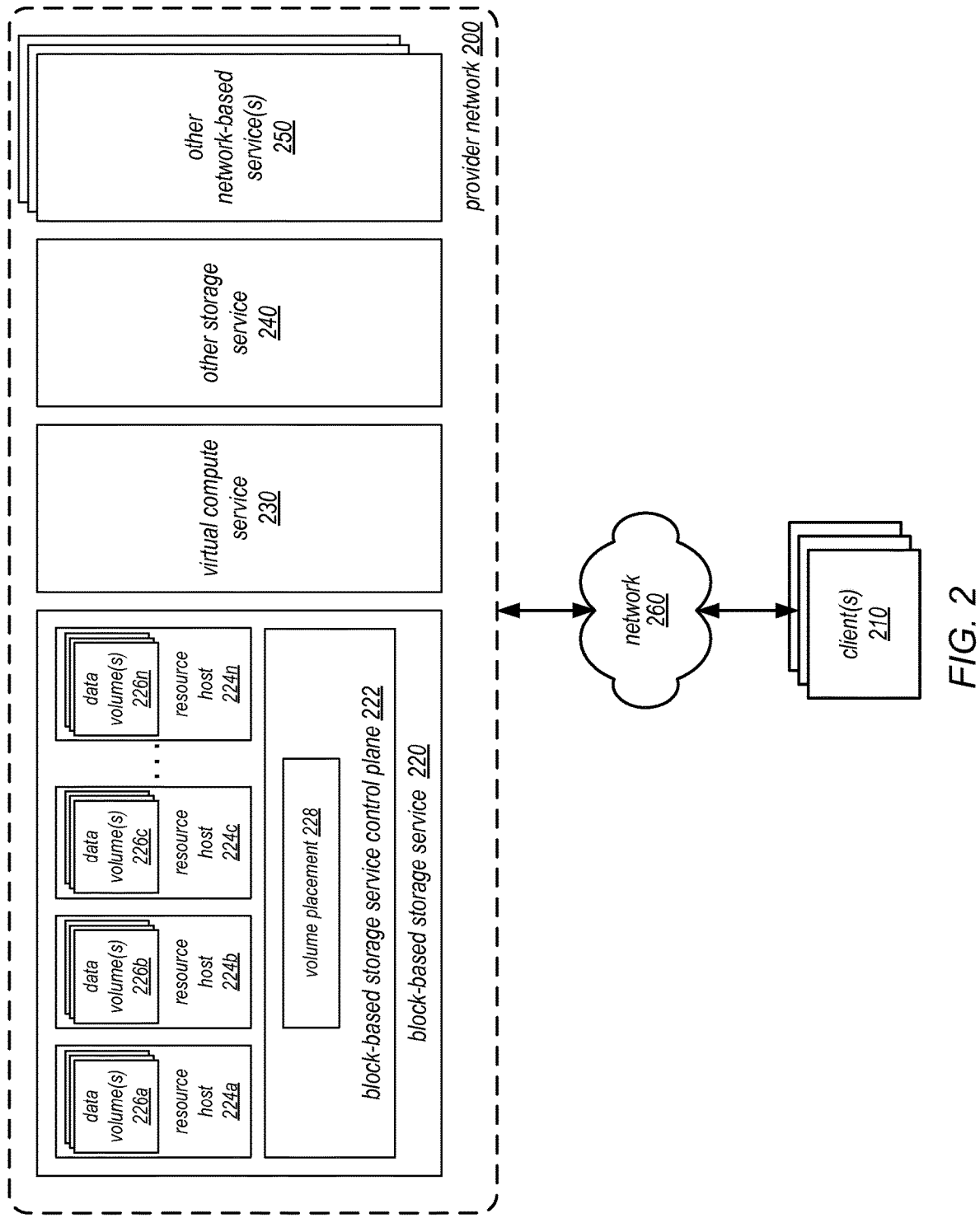
FIG. 2 is a block diagram illustrating a provider network that includes multiple network-based services such as a block-based storage service that implements resource host prioritization for resource placement, according to some embodiments.

FIG. 2 is a block diagram illustrating a provider network that includes multiple network-based services such as a block-based storage service that implements resource host prioritization for resource placement, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 230, storage services, such as block-based storage service 220 and other storage service 240

(which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
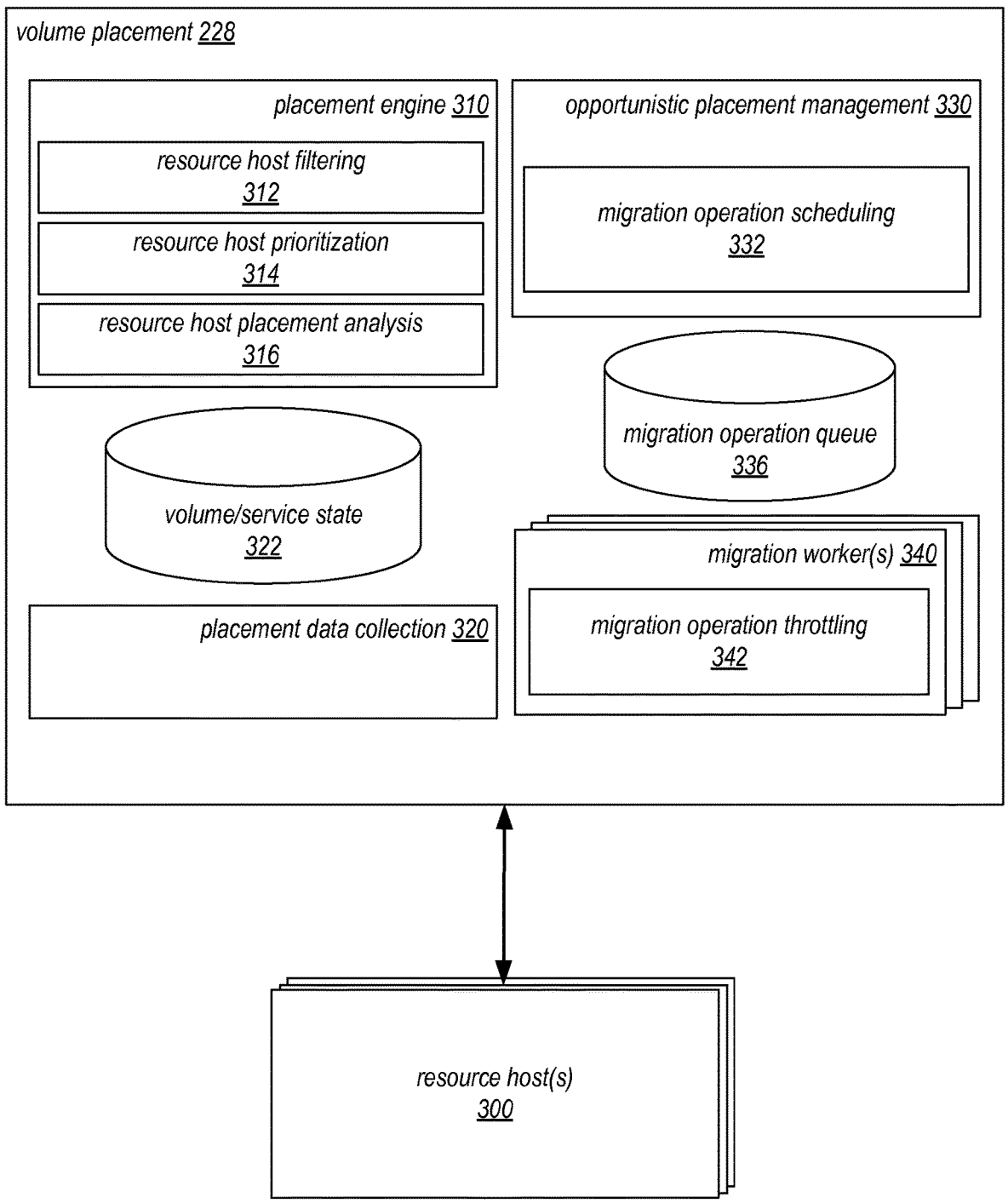
FIG. 3 is a logical block diagram illustrating volume placement that implements resource host prioritization for resource placement, according to some embodiments.

FIG. 3 is a logical block diagram illustrating volume placement that implements resource host prioritization for resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 8). Each resource host may maintain respective replicas of data volumes. Some data volumes may differ in size from other data volumes, in some embodiments. Resource hosts 300 may also provide multi-tenant storage. For example, in some embodiments, one resource host may maintain a data volume for one account of block-based storage service 220, while another data volume maintained at the same resource host may be maintained for a different account. Resource hosts 300 may persist their respective data volumes in one or more block-based storage devices (e.g., hard disk drives, solid state drives, etc.) that may be directly attached to a computing system or device implementing the respective resource host. Resource hosts 300 may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume.

For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 8). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure zones, partitions, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes according to placement requests for the new or migrating data volumes. Analysis may be performed with respect to the placement criteria, discussed above, to determine placement locations which may be optimal for individual resources, or for the block-based storage service as a whole.

Placement engine 310 may implement resource host filtering 312. As discussed above with regard to FIG. 1, resource host filtering may remove from evaluated resource hosts for a placement request, those resource hosts which do not satisfy placement constraints for a resource. For example, placement constraints may include resource hosts located outside of specified logical or physical localities (e.g., specified server pools, specified locations with respect other resources, such as implementing server rack diversity between master and slave replicas of a data volume), resource hosts with insufficient capacity to host the resource (e.g., insufficient processing, storage, and/or network capability to host the resource), and/or blacklisted or otherwise explicitly excluded resource hosts (e.g., a list of unavailable network addresses).

Figure 5A:
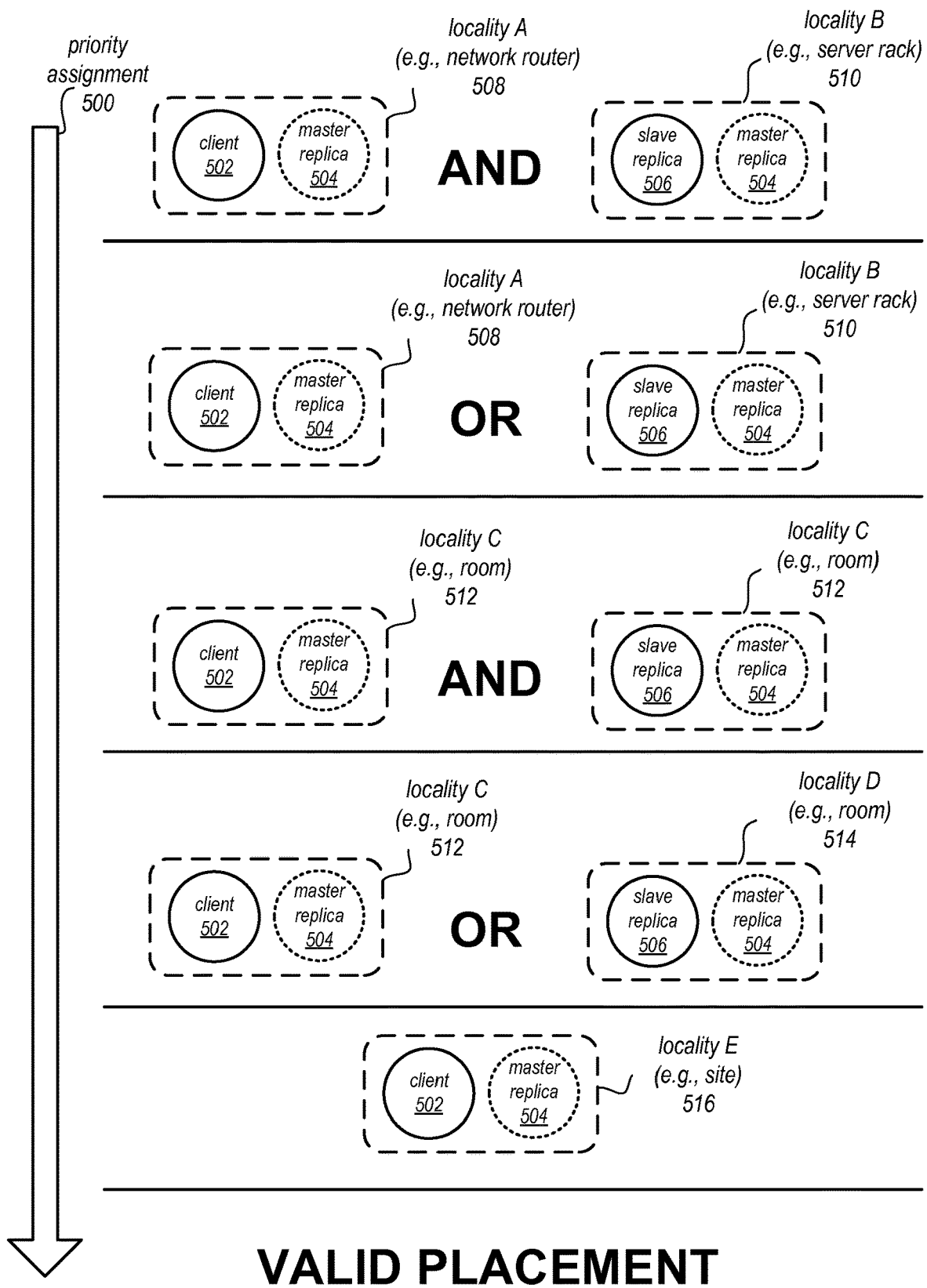
FIG. 5A illustrates a priority scheme for prioritizing resource hosts, according to some embodiments.

Placement engine 310 may implement resource host prioritization 314 which may be configured to assign resource hosts into priority sets, in some embodiments. For example, resource host prioritization may apply a priority scheme to resource hosts, evaluating the resource hosts according to the priority scheme and assigning each resource host to a priority set. FIG. 5A illustrates a priority scheme for prioritizing resource hosts, according to some embodiments.

A priority scheme may provide a way for determining more or less optimal resource hosts for placing a resource. One or more rules, criteria, or considerations may be made with respect to a resource host. As illustrated in FIG. 5A, multiple different prioritization considerations may be evaluated. Consider a request to place a master replica 504 of a data volume. At the top of FIG. 5A, for instance, a highest priority set assignment 500 may be determined if the illustrated conditions are met. For instance, if an evaluated resource host located in a locality A 508 with a client 502 for the data volume (e.g., connected to the same network router as client 502) AND located at the same locality B 510 (e.g., server rack) as slave replica 506, then the resource host may be assigned to a highest priority set.

The next highest priority set may be assigned if a resource host is located in a locality A 508 with a client 502 for the data volume (e.g., connected to the same network router as client 502) OR located at the same locality B 510 (e.g., server rack) as slave replica 506, then the resource host may be assigned to the priority set. The next priority set may be assigned if an evaluated resource host is located in a locality C 512 with a client 502 for the data volume (e.g., in the same data center room as client 502) AND located at the same locality C 512 (e.g., the room) as slave replica 506, then the resource host may be assigned to the priority set. The next priority set may be assigned if an evaluated resource host is located in a locality C 512 with a client 502 for the data volume (e.g., in the same data center room as client 502) OR located at the same locality D 514 (e.g., different room) as slave replica 506, then the resource host may be assigned to the priority set. The next priority set may be assigned if an evaluated resource host is located in a locality E 512 with a client 502 for the data volume (e.g., in the same site, such as the same data center), then the resource host may be assigned to the priority set. Any valid or unfiltered remaining resource hosts may then be assigned to the lowest priority set.

As illustrated in FIG. 5A, a combination of different types of localities (e.g., network and physical) may be implemented to determine different priority set assignments. Other considerations or types of localities or prioritization schemes may be implemented. In at least some embodiments, different types of priority schemes may be implemented for different types of resources. Generally, priority set assignments may be implemented to provide varying distributions of resource host optimality when prioritizing resource placements. In at least some embodiments, resource hosts may be assigned to a single priority set. However, as discussed below with regard to FIGS. 5B and 7, resource hosts from other priority sets may be evaluated at the same time as resource hosts from a different priority set.

Figure 5B:
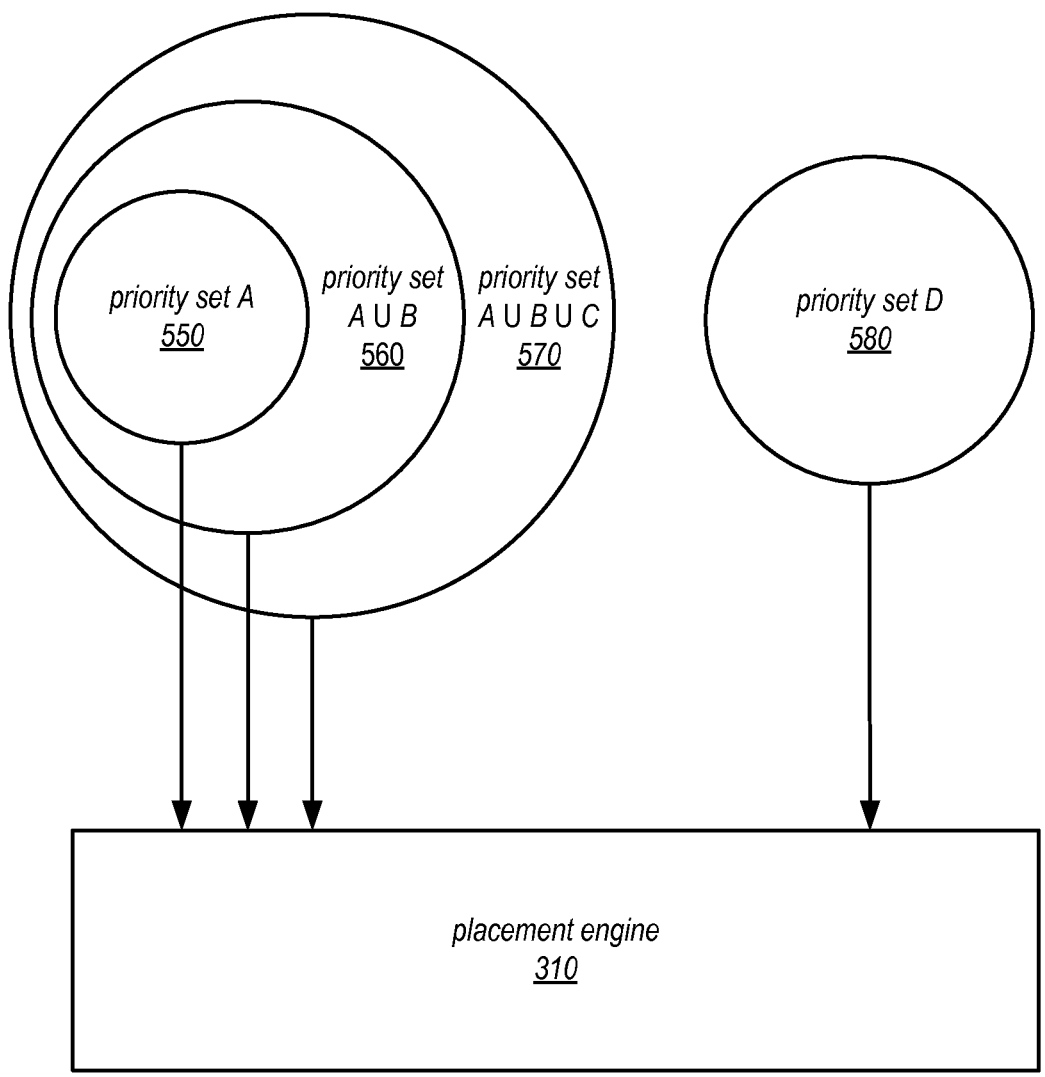
FIG. 5B illustrates priority sets for placing resources, according to some embodiments.

Once resource hosts are assigned into priority sets, resource host placement analysis 316 may select resource hosts from the priority sets, determining some resource hosts as candidate resource hosts to provide for placement recommendations. Priority sets can be utilized in many different ways to distribute the optimality of resource hosts for placing a resource that are included in a recommendation. For instance, the number of recommendations made from different priority sets may be determined based on priority. More recommendations may be made for resource hosts in a higher priority set than a lower priority set (even if the lower priority set has a larger number of resource hosts). Priority sets may be combined in different ways as well for determining which resource hosts to evaluate. FIG. 5B illustrates priority sets for placing resources, according to some embodiments.

Priority set A 550 may be the highest priority set. A number of resource hosts may be chosen from priority set A 550 (e.g., random k resource hosts). The chosen resource hosts may then be evaluated (as discussed below) and the best or most optimal resource hosts may be chosen according to the number recommendations to be made from priority set A 550. Next, instead of choosing hosts from just priority set B, resource hosts may be chosen randomly from priority sets A and B combined 560. Thus, while some more resources may be evaluated from priority set A, it is likely that resource hosts may be evaluated from priority set B as well. Candidate resource hosts may be determined from the mixed pools of resource hosts from 2 different priority sets. Similarly, another selection of resource hosts for evaluation may be made from the combination of priority sets A, B, and C 570. In some embodiments, priority set D 580 may represent a lowest priority set. Resource hosts may be chosen from this set alone, in order to provide one or more candidate resources as resources that are unlikely to have correlated failures with other resource hosts evaluated from the other priority sets. In this way it may be ensured that at least one candidate resource host recommended may be available to place a resource. Please note that example combinations of priority sets discussed above are not intended to be limiting. Other combinations (or no combinations) may be made to select resource hosts. For instance, a random k selection from each priority set separately may be performed. In some embodiments, as discussed below with regard to FIG. 7, if there are not at least k resource hosts in a priority set, then enough resource hosts from another priority set (such as a priority set adjacent or next in priority) may be chosen to make up the k resource hosts for that priority set.

Resource host placement analysis 316 may also evaluate resource hosts selected from priority sets to determine whether to select the resource host as a candidate resource host. For example, scores may be generated for placements at the selected resources that reflect one or more multiple different considerations for determining an optimal placement. Analysis may be performed to prevent multiple master-slave replica pairs from being placed on the same two resource hosts. In some embodiments, resource host fragmentation analysis may be performed, to optimize placement of resources on resource hosts that can host the resource and leave the least amount of space underutilized. Evaluation of placement criteria may also include: evaluating available capacity to host the resource at the resource host; time since last communication was received; a ratio or other combination of utilization data to determine the ways in which multiple portions of a resource host (e.g., storage, processing, or network) are optimally utilized to host a resource, resource capacity fragmentation (e.g., how much capacity at resource host(s) is wasted as a result of placing the resource at the resource host); and desired locality (e.g., in respective infrastructure zones or units as discussed above).

Other analyses may be implemented, such as configuration analysis to evaluate prospective placement configurations of all resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Prospective placement configurations may be generated or identified based on the available resource hosts for the resource. Other replicas of the data volume may be evaluated based on actual or hypothetical placement locations. One or more infrastructure zone localities may be determined for the different prospective placement configurations, in various embodiments, based on volume/service state 332. One or more infrastructure zone localities may be determined for the different prospective placement configurations of a distributed, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host).

Placement engine 310 may perform configuration analysis upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-slave replica pairs. Configuration analysis may be performed based on the placement configuration for each portion of the data volume that is replicated (e.g., each master-slave replica pair) or all of the data volume partitions (e.g., all 3 of the master-slave replica pairs).

For instance, placement engine 310 may implement configuration analysis to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume), similar to the examples of priority set assignment discussed above with regard to FIG. 5A (e.g., showing priority assignments based on clients and slave volumes for a master replica volume). Configuration analysis may be performed to consider the impact of migrating currently placed resources to other resource hosts in order to free up space at resource hosts that would provide better configurations for other resources of a distributed resource (e.g., move a slave volume to another host to make room for a different slave volume at the host which would be in the same infrastructure zone as a master of the volume or a client of the volume).

In some embodiments, volume placement 228 may implement opportunistic placement manager 330. Opportunistic placement management 330 may dynamically or proactively migrate currently placed resources (e.g., volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource). For example, opportunistic placement manager 330 may implement migration operation scheduling 332 to request placements for resources from placement engine 310 that are determined to be placed sub-optimally (e.g., a lower scoring infrastructure zone category). Migration operation scheduling 332 may then determine which placements if performed would exceed a migration optimization threshold (e.g., a difference between a current placement score and new placement score). For those resources with possible placements that would exceed the placement optimization threshold, migration operation scheduling 332 may place a migration operation for the partition in migration operation queue 336. In some embodiments, migration operation scheduling 332 may assign a priority to migration operations, so that more beneficial migration operations are performed sooner.

Migration operation scheduling 332 may also remove migration operations from queue 336, such as those migration operations identified as complete or failed. Those migration operations that have not yet been performed may have update priorities stored in the queue (e.g., raising or lowing the priority value). Time of last update may indicate when an update to the migration operation in the queue was last made. For example, a migration operation that has a later update time than other migration operations, may be considered to have more recent/relevant data. Priority values may be assigned to migration operations in order to schedule the migration operations opportunistically. In at least some embodiments, migration operation queue 336 may be implemented as a priority queue, and thus the highest priority migration operation may be selected for performance.

Migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 310, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 310, networking device(s), router(s), switches, power source(s), or other component or device of a virtual block-based storage service may be evaluated with respect to the effect of performing the identified resource migration operation. Different migration limits (e.g., number of migration operations, network utilization, resource host utilization, etc.) may be enforced with respect to the network localities. If the migration operation exceeds the limit for one of the different network localities, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with perform a migration, such as zones that include the current and destination resource hosts of a migration operation). In some embodiments, opportunistic placement management 330 may perform migration operation throttling in addition to, or in place of migration worker(s) 340.

In various embodiments, migration worker 340 may request an updated placement for a resource that is to be migrated from placement engine 310, which may perform the various techniques discussed above and below to provide a new placement location for the resource.

Figure 4:
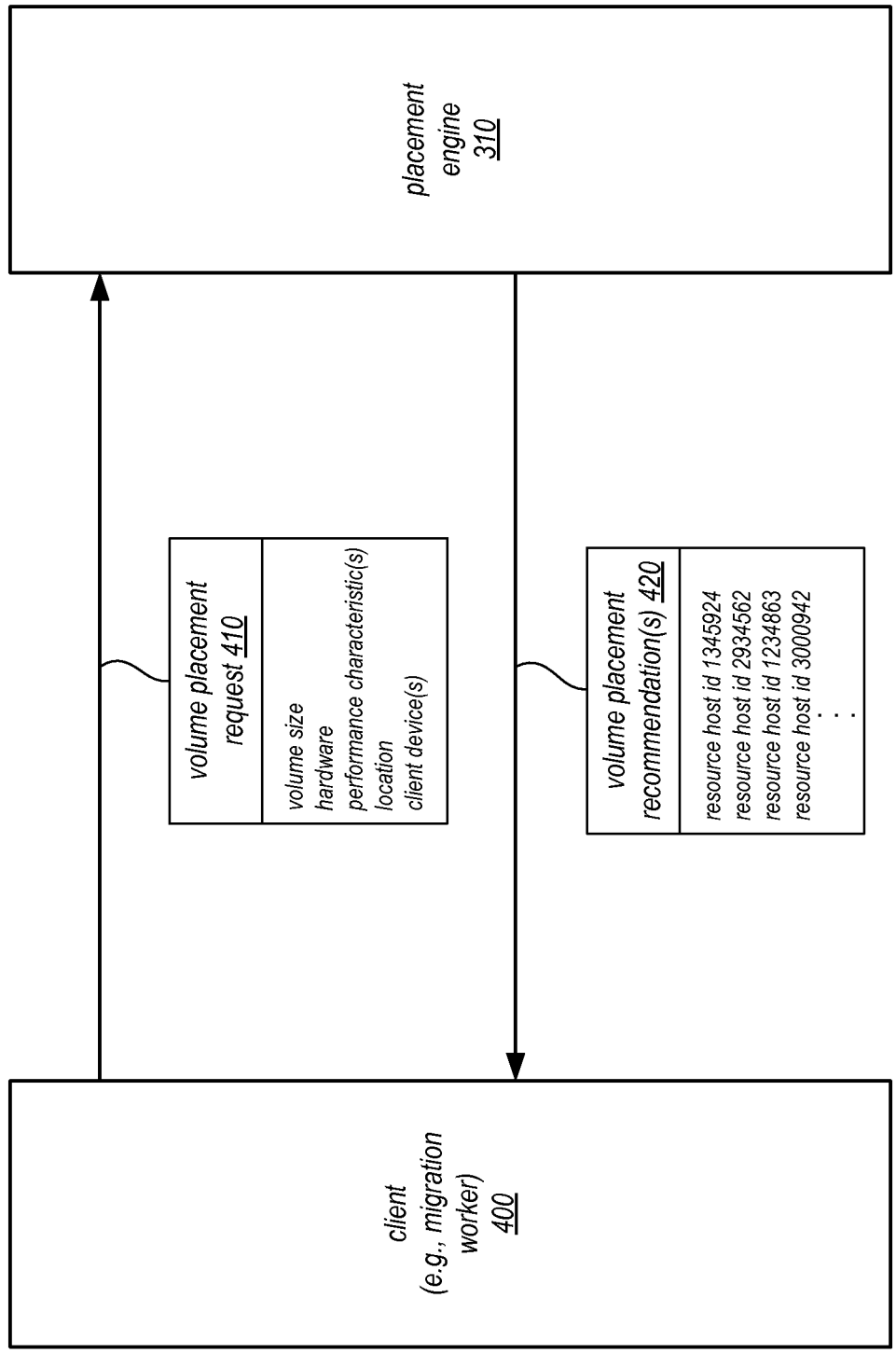
FIG. 4 is a logical block diagram illustrating a volume placement request, according to some embodiments.

FIG. 4 is a logical block diagram illustrating a volume placement request, according to some embodiments. Volume placement requests may occur as a result of a request to create a new volume, (e.g., to place a new master/slave replica) or to move a currently existing volume from a current resource host to a new resource host. As illustrated in FIG. 4, various information about the volume placement request 410 may be provided from a client 400 (which may be an external client 210 or other internal system, component, service or device, such as a component of a control plane that directs placement operations like migration worker(s) 340 in FIG. 3). Volume placement request 410 may include various information about the volume to place, including the volume size, hardware (e.g., SSD or HDD), performance characteristics (e.g., number of IOPs), location (e.g., data center, fault tolerant zone), and/or client devices accessing the volume. In some embodiments, request 410 may identify a logical group or association within which the resource may be placed (e.g., particular resource hosts/infrastructure units mapped to the logical group may be identified). The volume placement request may include a request for a number of placement recommendations, in some embodiments.

Volume placement recommendation(s) 420 may be sent from placement engine 310 to client 400. Identification (e.g., resource host id and/or network address) and/or other information about resource hosts upon which an attempt to place a resource may be included. In some embodiments, the resource hosts may be provided in an ordering of priority or performance. Client 400 may then attempt to place the resource at the resource hosts in the provided ordering (e.g., to place the resource at a more optimal location first, if possible).

Figure 6:
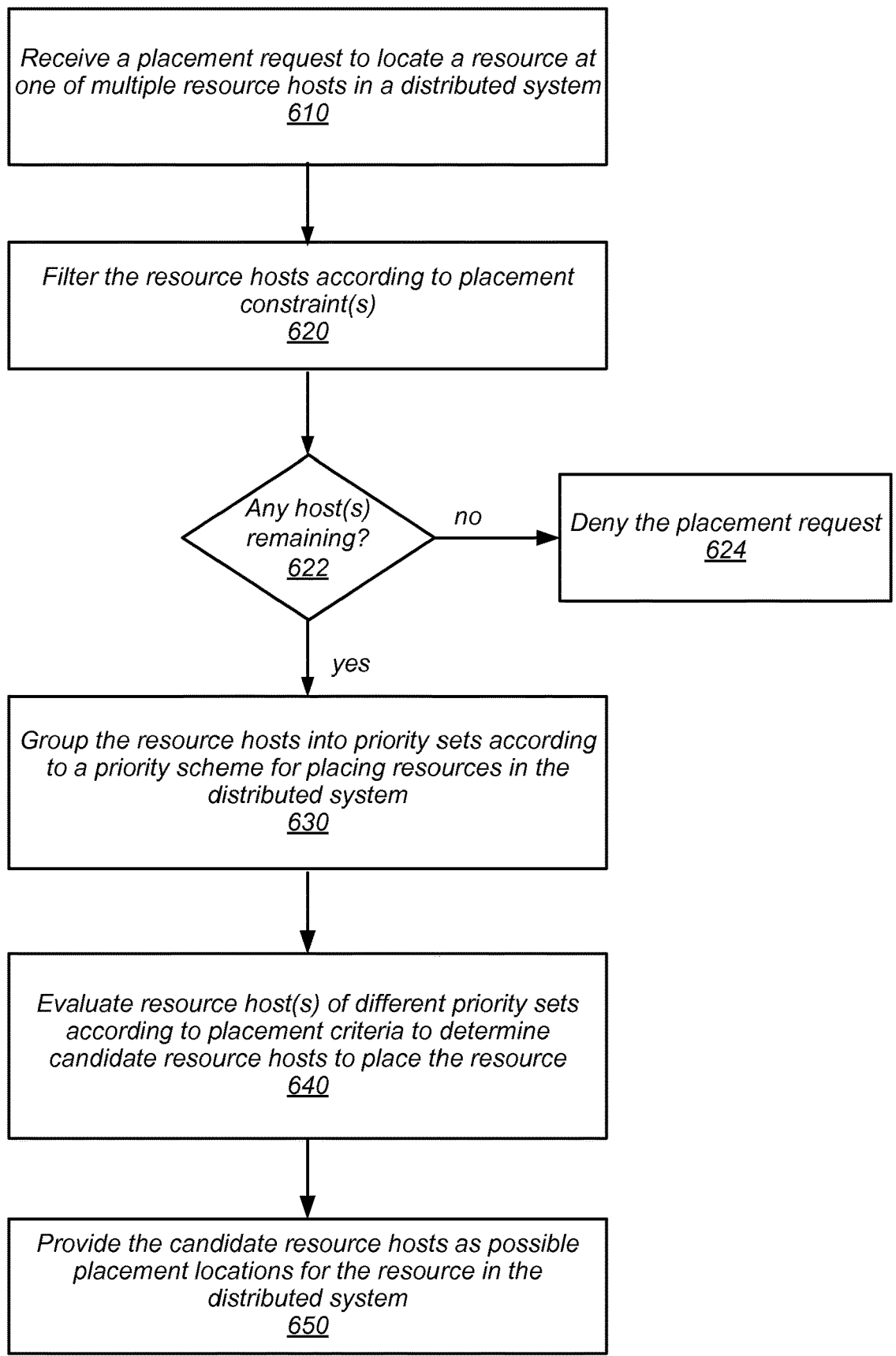
FIG. 6 is a high-level flowchart illustrating various methods and techniques for prioritizing resource hosts for resource placement, according to some embodiments.

The examples of prioritizing resource hosts for resource placement discussed above with regard to FIGS. 2-5 have been given in regard to a block-based storage service and/or other network-based services. Various other types or configurations of systems placing resources at resource hosts may implement these techniques, such as virtual computing service 230 to place virtual compute instances. In another example, a backup or archive distributed storage system may determine placements for currently placed data. Different configurations of the various modules, components, systems, and or services described above that may implement prioritizing resource hosts for resource placement may be configured to assign resource hosts to priority sets, evaluate resource hosts in different priority sets according to placement criteria, and provide candidate resource hosts. FIG. 6 is a high-level flowchart illustrating various methods and techniques for prioritizing resource hosts for resource placement, according to some embodiments. These techniques may be implemented using a control plane, placement engine or other component for placing resources at currently placed at other resource hosts in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master replica and one or more replica slaves.

As indicated at 610, a placement request to locate a resource at one of multiple resource hosts in a distributed system may be received. For instance, the request may be received as part of a (or in response to) creation or other similar request to place a new resource at the distributed system, such as place master or slave replica of a data volume or a virtual compute instance. In another example, the request may be received to place an already existing resource at a different resource host, such as may be performed by automated or opportunistic resource placement system discussed above with regard to FIG. 3. The request may indicate various information about the resource to be placed, such as various placement constraints (e.g., hardware or software constraints) or desired/optimal placement information. FIG. 4, discussed above provides further examples of placement requests. The request may be received via an interface which may be of various types, including graphical and/or programmatic interfaces from a client of a distributed system, or other component, system, service, or device internal to the distributed system (e.g., a dynamic or automated migration system for placed partitions, such as opportunistic placement manager 330).

In response to receiving the placement request, candidate resource hosts may be provided for placement of the resource. As indicated at 620, in at least some embodiments, the resource hosts may be filtered according to placement constraint(s) for the resource. For example, placement constraints may include resource hosts located outside of specified logical or physical localities (e.g., specified server pools, specified locations with respect other resources, such as implementing server rack diversity between master and slave replicas of a data volume), resource hosts with insufficient capacity to host the resource (e.g., sufficient processing, storage, and/or network capability to host the resource), and/or blacklisted or otherwise explicitly excluded resource hosts (e.g., a list of unavailable network addresses). If no resource host(s) remain after filtering the resource host(s), as indicated by the negative exit from 622, then the placement request may be denied, in some embodiments, as indicated at 624.

As indicated at 630, the resource hosts (which may be those resources hosts not filtered out at 620 as indicated by the positive exit from 622) of the distributed system may be grouped into priority sets according to a priority scheme for placing resources in the distributed system. As noted above, priority set assignments may be implemented to provide varying distributions of resource host optimality when considering candidate resource hosts for placing a resource. For instance, a priority function may be implemented to generate priority values for different resources. The resource hosts may then be divided or grouped according to priority values. In some embodiments, priority sets may have predetermined size limits, or membership may be solely determined based on priority values of the resource hosts. For instance, priority values assigned to different priority sets may be adjusted to adjust the numbers of resource hosts assigned to priority sets (e.g., priority set A with range of priority values 1-50 may be adjusted to priority values 1-40 in order to reduce the possible number of resource hosts that may be assigned to the priority set. Resource hosts may exclusively belong to a single priority set, in some embodiments.

Assignment to a priority set may group those resource hosts for which the desirability or optimality of placing a resource is similar. For example, the most desirable resource hosts for placement may be grouped together, and the next most desirable resource hosts grouped together, and so on. The priority scheme may be based on various different desirable placement configurations or criteria. For instance, in at least some embodiments, the prioritization scheme may assign priority according to network locality of the resources. Network locality may be one or more locations, connections, associations, or zones in a network of the distributed system to which a resource host belongs. A resource host may, for example, itself be a node or particular network location (e.g., network address) and thus a network locality. Network locality may be determined based on the network router, switch, or other network device or infrastructure (e.g., network spine) to which a resource host is connected. Network localities may be logically determined according to logically associated network devices or resource hosts in some embodiments. A resource host may belong to multiple network localities, such as being connected to a particular network router, which may be in turn linked to other network routers, or networking devices.

In some embodiments, a prioritization scheme may be applied according to physical locality. For example, the physical or geographical location of a resource host may be identified and considered for the purposes of assigning priority to resource hosts. Examples of physical or geographical locations may include data center, site, data center room, row, server rack, or any other indication that provides a physical locality for the resource host. Please note that the previous examples of network locality and physical locality are provided as examples of considerations that may be used to assign resource hosts into priority sets for according to a priority scheme. Numerous other considerations or criteria may be employed as part of the prioritization scheme. For instance, one or more of the placement criteria discussed above with regard to FIG. 3, or below, may be used in addition to or instead of network locality and/or physical locality.

In some embodiments, combinations of different considerations may be implemented as part of the priority scheme, as discussed above with regard to FIG. 5A (e.g., evaluating both network and physical locality). Moreover, in some embodiments, priority schemes may account for the placement (or possible placement) of other resources associated with the resource being placed (e.g., a distributed resource that includes multiple individual resources). Consider the examples discussed above with regard to FIG. 5A. Placement of a resource, such as a master replica of a data volume that is associated a slave replica and/or a client of the data volume, may be performed by prioritizing resource hosts that are located in different localities (e.g., physical or network) with respect to other resources associated with the resource (e.g., slave replica(s) or a data volume client). Different priority schemes may be applied to resource hosts for different types of resources, such as a priority scheme for placing virtual compute instances, master replicas of a data volume, or slave replicas of a data volume.

As indicated at 640, resource host(s) of different priority sets may be evaluated according to placement criteria to determine candidate resource hosts to place the resource. Different techniques to select or identify resource hosts from the priority sets may be implemented, such as those techniques discussed below with regard to FIG. 7. Thus, in at least some embodiments, a subset of resource hosts in each priority set may be evaluated. However, in other embodiments, the entire number of resource hosts assigned to a priority set may be evaluated in one or multiple priority sets. The numbers of resource hosts evaluated from priority sets may be determined in order to tune the performance cost of prioritizing resource hosts (e.g., the more hosts examined the grater greater the costs, the less hosts examined the less the performance costs). Selection from different priority sets may be implemented to weight or prioritize resource hosts from some priority sets over other priority sets. Increasing the number of resource hosts evaluated and selected from a priority set may effectively increase the likelihood that a resource host from that priority set may have the resource placed thereon. In this way, the likelihood of providing candidate resource hosts that are more optimal for placing the resource may be controlled.

Placement criteria may, in various embodiments, be used to select evaluated resource hosts as candidate resource hosts to recommend for placing the resource. Placement criteria may include many different considerations, characteristics, or other information about which a resource host may be evaluated for optimality of placement for the resource. For example, placement criteria may include any of the analysis discussed above with regard to placement engine 310, such as available capacity to host the resource at the resource host, time since last communication was received, a ratio or other combination of utilization data to determine the ways in which multiple portions of a resource host (e.g., storage, processing, or network) are optimally utilized to host a resource, resource capacity fragmentation (e.g., how much capacity at resource host(s) is wasted as a result of placing the resource at the resource host), and desired locality (e.g., in respective infrastructure zones or units as discussed above).

Determination of a candidate resource host may be made according to a scoring threshold, or other heuristic for identifying which resource hosts should be included as a candidate resource host for placement, in various embodiments. For instance, a threshold or other measure may be used to compare placement scores generated for the resource hosts with a minimum or ideal placement. In some embodiments, the request to place a resource may include a number of candidate resource hosts to provide as possible placement locations. Evaluation of resource hosts and determinations as whether to include the evaluated resource host as a candidate resource host may be performed until the number of request candidate resource hosts is met.

As indicated at 650, in various embodiments, the candidate resource hosts may be provided as possible placement locations for the resource in the distributed system such that the resource is placed at one of the candidate resource hosts. For example a response may be sent that includes a list of candidate resource hosts. The list of candidate resource hosts may be arranged in order of priority or preferred placement, in some embodiments. A migration worker, or other system, component, or device placing the resource may try to place the resource at individual resource hosts according to the order of priority or preferred placement. If placement at a candidate resource host is successful, remaining candidate resource hosts may be discarded, in some embodiments.

Figure 7:
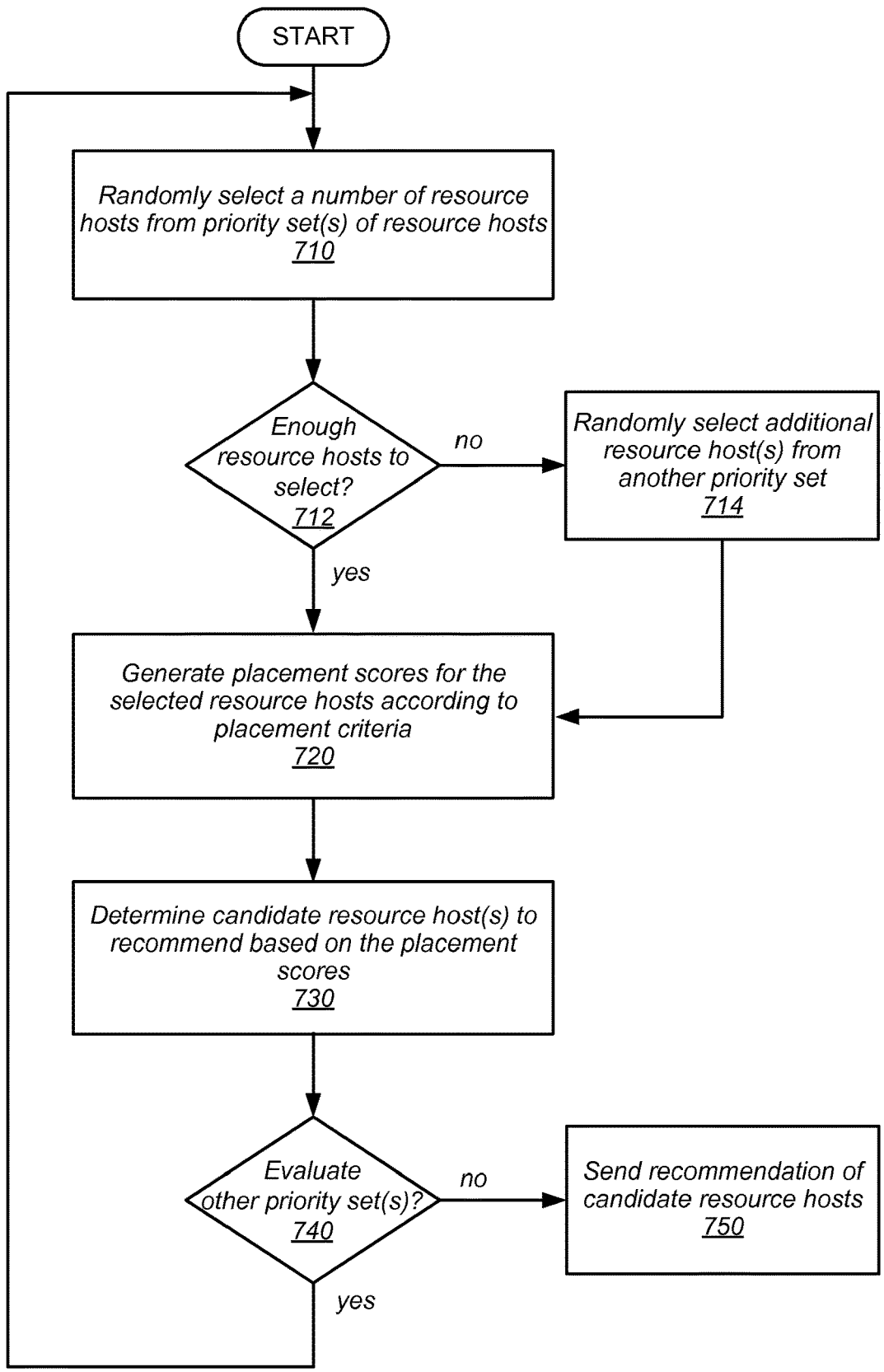
FIG. 7 is a high-level flowchart illustrating various methods and techniques for evaluating resource hosts of priority sets according to placement criteria to determine candidate resource hosts to place a resource, according to some embodiments.

Prioritizing resource hosts using priority sets may be performed in many different ways. FIG. 7 is a high-level flowchart illustrating various methods and techniques for evaluating resource hosts of priority sets according to placement criteria to determine candidate resource hosts to place a resource, according to some embodiments. As indicated at 710, in various embodiments, a number of resource hosts may be randomly selected from priority set(s) of resource hosts. For example, k number of resource hosts may selected from a single priority set. In some embodiments, k number of resource hosts may be selected from a combined priority sets, such as discussed above with regard to FIG. 5B. A random number generator or other randomization technique may be used to provide nearly random selection of resource hosts from the priority set(s). As indicated at 712, in some embodiments a priority set may not contain sufficient resource hosts to satisfy the number of resource hosts (e.g., hosts in priority set A<k). As indicated by the negative exit from 712, additional resource host(s) may be randomly selected from another priority set, as indicated at 714, in some embodiments. For instance, resource hosts from a next priority set (in terms of most desired priority set after the current priority set(s)) may be selected for consideration.

As indicated at 720, placement scores for the selected resource hosts may be generated according to placement criteria. For example, different fitness or desirability scores for various different placement criteria may be weighted and/or combined to calculate a single placement score for the resource hosts. Based, at least in part, on the placement score(s), candidate resource host(s) may be determined, as indicated at 730. For instance, a threshold may be implanted and compared with the generated placement scores. Resource hosts that have scores exceeding the threshold may be determined as candidate resource hosts, in some embodiments. As noted earlier, a placement request may include a number of requested locations for placement. Thus a predetermined amount or number of locations from a given priority set may be enforced such that after determining one or more candidate resource hosts for the plurality set(s) up to the predetermined amount, no further candidate resource hosts may be determined. In this way, different priority sets may provide resource hosts that are recommended, avoiding common failure tendencies of resource hosts in the same priority set, in some embodiments.

As indicated at 740, other priority set(s) may be evaluated to determine candidate resources. A distribution of the number of requested placement locations may be made amongst the priority sets (or evaluations of the priority sets). For instance, as discussed above with regard to FIG. 4B, a first evaluation of a single priority set may be made, then a combined two priority sets, then a combined three priority sets, and finally a another single priority set. The number of candidate resources from a priority set may be used to ensure that placement locations of differing optimality may be provided. (e.g., more selections take from a more desirable priority set, with less selections taken from a less describable set or combination of sets), or in order to prevent candidate resource hosts with the potential for the same common or correlated failures to be sent as candidate resource hosts. Thus, the techniques described in FIG. 7 may be repeated on one or more multiple times with respect to one or combinations of multiple priority sets. If the number of requested candidate resource hosts have been determined (e.g., the number of requested candidate resource hosts have been identified), then as indicated at 750, a recommendation of the determined candidate resource hosts may be sent.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
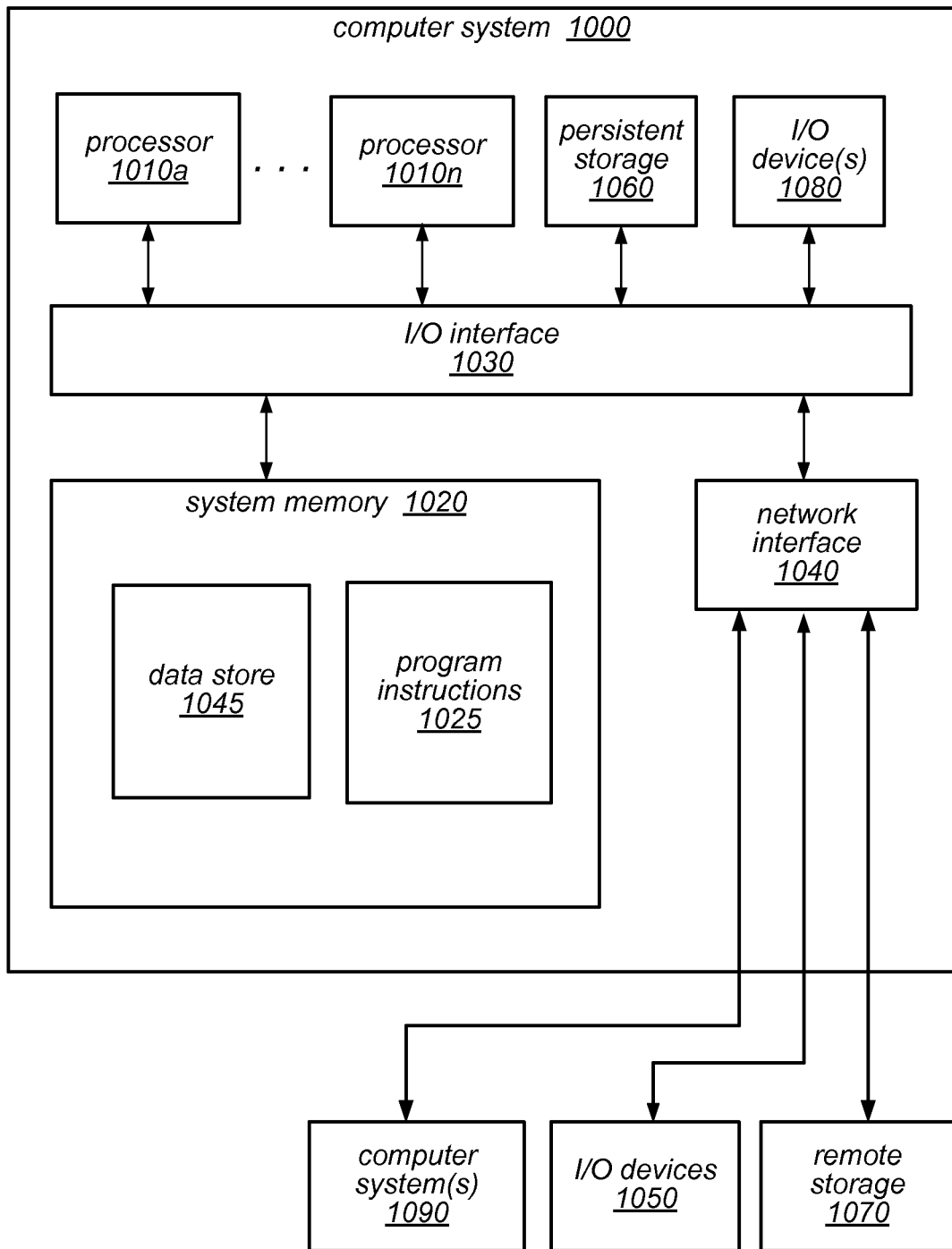
FIG. 8 is a block diagram illustrating an example computing system, according to some embodiments.

Embodiments of prioritizing resource hosts for resource placement as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of resource hosts, configured to host a plurality of resources;
a placement engine, configured to:
receive, from a client, a placement request to identify a candidate resource host of resource hosts in a distributed system, the identified candidate resource host being for placement of a resource, wherein the resource is a computing, storage or networking resource;
apply, in response to the placement request, a priority scheme for placing resources in the distributed system at the plurality of resource hosts, wherein, for several groups of one or more resource hosts, application of the priority scheme assigns resource hosts to priority sets of a plurality of priority sets, wherein one of the priority sets includes a plurality of resource hosts having preferred placement of the resource based on meeting one or more placement criteria with respect to resource hosts included in the other priority sets;
determine, from the plurality of priority sets and according to specified placement criteria, a plurality of candidate resource hosts to recommend for placement of the resource, wherein at least one candidate resource host is assigned to a different priority set than another candidate resource host; and
transmit to the client, in response to the placement request, an indication of one or more of the plurality of candidate resource hosts determined for placement of the resource.

2. The system of claim 1, wherein the placement engine is further configured to:
  prior to the assignment of individual ones of the resource hosts into the priority sets, filter the resource hosts according to one or more constraints for the resource.

3. The system of claim 1, wherein to determine the plurality of candidate resource hosts at which to place the resource, the placement engine is configured to:
  randomly select a number of resource hosts from one or more of the priority sets;
  generate placement scores for the selected resource hosts according to the placement criteria; and
  based, at least in part, on the placement scores, determine the candidate resource hosts.

4. The system of claim 1, wherein the distributed system is a virtual block-based storage service, and wherein the resource is a data volume implemented for a client of the virtual block-based storage service.

5. A method, comprising:
  performing, by one or more computing devices:
    receiving, from a client, a placement request to identify a candidate resource host of resource hosts in a distributed system, the identified candidate resource host for placing a resource, wherein the resource is a computing, storage or networking resource;
    grouping, in response to the placement request, individual ones of the resource hosts into a plurality of priority sets according to a priority scheme, for placing resources in the distributed system, that assigns resource hosts to priority sets of a plurality of priority sets, wherein one of the priority sets includes a plurality of resource hosts having a preferred placement of the resource based on meeting one or more placement criteria with respect to resource hosts included in the other priority sets;
    determining, from the plurality of priority sets and according to specified placement criteria, a plurality of candidate resource hosts to recommend for placement the resource, wherein at least one candidate resource host is assigned to a different priority set than another candidate resource host; and
  transmitting to the client, in response to the placement request, an indication of one or more of the plurality of candidate resource hosts determined for placement of the resource.

6. The method of claim 5, further comprising:
  prior to grouping the individual resource hosts into the priority sets, filtering the resource hosts according to one or more constraints for the resource.

7. The method of claim 5, wherein grouping according to the priority scheme comprises assigning resource hosts to priority sets according to network locality.

8. The method of claim 5, wherein determining the plurality of candidate resource hosts from the plurality of priority sets comprises evaluating one or more resource hosts from a combined two or more of the priority sets and evaluating another resource host from another of the priority sets.

9. The method of claim 5, wherein determining the plurality of candidate resource hosts from the plurality of priority sets comprises:
  randomly selecting a number of resource hosts from at least two of the priority sets;
  generating scores for the selected resource hosts according to the placement criteria; and
  based, at least in part on the placement scores, determining the candidate resource hosts.

10. The method of claim 5, further comprising:
  migrating the resource to one of the indicated candidate resource hosts, and
  wherein the request for placing the resource is received as part of migrating the resource.

11. The method of claim 5, further comprising:
  placing the resource at one of the indicated candidate resource hosts in the distributed system, and
  wherein the request for placing the resource is a request to place a new resource in the distributed system.

12. The method of claim 5, wherein the distributed system is a network-based service and wherein the placement request is received from a client of the network-based service.

13. A non-transitory, computer-readable storage medium, storing program instructions that when executed by one or more computing devices cause the one or more computing devices to implement:
  receiving, from a client, a placement request to identify at least one candidate resource host of resource hosts in a distributed system, the identified candidate resource host for placing a resource, wherein the resource is a computing, storage or networking resource;
  grouping, in response to the placement request, individual ones of the resource hosts into a plurality of priority sets according to a priority scheme, for placing resources in the distributed system, that assigns resource hosts to priority sets of a plurality of priority sets, wherein one of the priority sets includes a plurality of resource hosts having a preferred placement of the resource based on meeting one or more placement criteria with respect to resource hosts included in the other priority sets;
  determining, from the plurality of priority sets and according to specified placement criteria, a plurality of candidate resource hosts to recommend for placement of the resource, wherein at least one candidate resource host is assigned to a different priority set than another candidate resource host; and
  transmitting to the client, in response to the placement request, an indication of one or more of the plurality of candidate resource hosts determined for placement of the resource.

14. The non-transitory, computer-readable storage medium of claim 13, wherein the program instructions cause the one or more computing devices to further implement:
  prior to grouping the individual resource hosts into the priority sets, filtering the resource hosts according to one or more constraints for the resource.

15. The non-transitory, computer-readable storage medium of claim 13, wherein the priority scheme comprises assigning resource hosts to priority sets according to physical locality of respective resource hosts.

16. The non-transitory, computer-readable storage medium of claim 13, wherein, in determining the plurality of candidate resource hosts at which to place the resource, the programming instructions cause the one or more computing devices to implement:
  randomly selecting a number of resource hosts from at least two of the priority sets;
  generating placement scores for the selected resource hosts according to the placement criteria; and
  based, at least in part, on the placement scores, determining the candidate resource hosts.

17. The non-transitory, computer-readable storage medium of claim 13, wherein the programming instructions cause the one or more computing devices to perform:

moving the resource to one or more of the plurality of candidate resource hosts determined for placement of the resource; and wherein the request to place the resource is received as part of moving the resource.

18. The non-transitory, computer-readable storage medium of claim 13, wherein the resource is a particular type of resource, and wherein the programming instructions cause the one or more computing devices to perform:

prioritizing, in accordance with the prioritization scheme, placement of the resource according to the particular type of the resource.

19. The non-transitory, computer-readable storage medium of claim 13, wherein the programming instructions cause the one or more computing devices to perform:

implementing the distributed system as a virtual computing service, and implementing the resource as a virtual compute instance for a client of the virtual computing service.

* * * * *